Dec. 13, 1949     H. T. WINCHEL     2,491,020
ECHO RANGING APPARATUS
Filed April 25, 1947

INVENTOR
H. T. WINCHEL
BY *Ellsworth*
ATTORNEY

Patented Dec. 13, 1949

2,491,020

UNITED STATES PATENT OFFICE 2,491,020

ECHO RANGING APPARATUS

Henry T. Winchel, Roscoe, Calif., assignor to Bendix Aviation Corporation, South Bend, Ind., a corporation of Delaware Application April 25, 1947, Serial No. 743,797

4 Claims. (Cl. 177—386)

This invention relates to echo ranging apparatus for ascertaining distances from the time required for waves to traverse the distances and be reflected back to the starting point, and is particularly useful in determining the depth of water with sonic or supersonic waves.

An object of the invention is to provide ranging apparatus that is simple and reliable and produces clear cut, accurate signals.

Other more specific objects will appear from the following detailed description of the invention.

Figure 1:
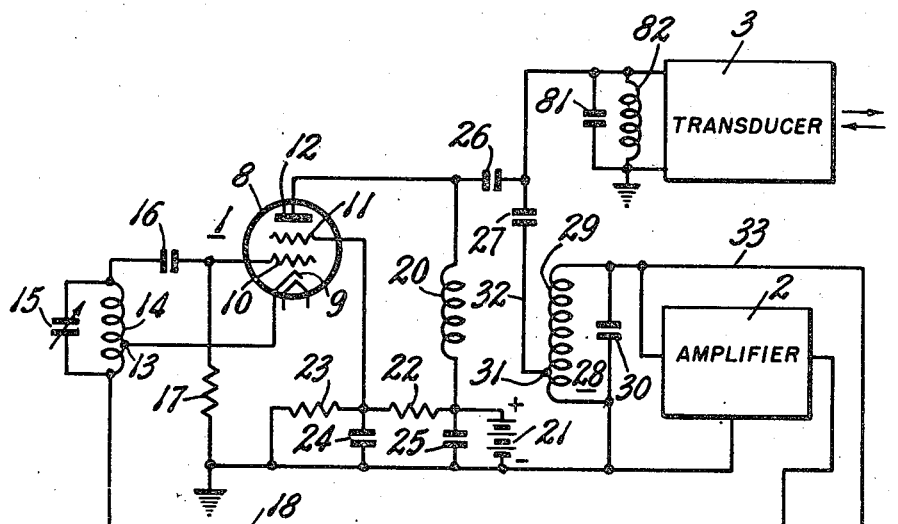
Fig. 1 is a schematic diagram showing one embodiment of the invention.

Briefly, the apparatus comprises as its main elements, a vacuum tube oscillator 1, an amplifier 2, a transducer 3, a recorder or indicator 4, and a synchronous switch 5. The recorder 4 includes a rotatable stylus arm 6 which moves a stylus on the end thereof across a record strip 7 at a predetermined speed. The arm 6 rotates in counterclockwise direction and is operated in synchronism with the switch 5, which causes the oscillator 1 to apply electrical oscillations to the transducer 3 at a predetermined time with reference to the rotation of the arm 6. For example, the oscillator may apply the oscillations to the transducer 3 at the instant that the stylus of the arm 6 traverses the upper edge of the record strip 7. The transducer 3 converts the electrical oscillations into mechanical waves which are radiated into the medium through which the distance is to be determined. Thus the apparatus may be mounted on board a ship, and the transducer 3 may be submerged in the water so as to transmit vibrational waves through the water. The wave is reflected from objects in the water of different density, and the reflected waves return to the transducer 3, which converts them to electrical oscillations. These electrical oscillations are amplified in the amplifier 2 and applied to the arm 6, and through the stylus on the arm to the record strip 7, the latter being of such a nature as to produce a visual indication in response to an electrical excitation of the stylus. It will be apparent that since the time required for the wave to be propagated from the transducer 3 to the reflection point and then reflected back to the transducer is a function of the distance between the transducer and the reflecting medium, the arm 6 will have rotated a distance proportional to the distance to be indicated at the time the stylus is excited to produce a mark on the strip 7.

Apparatus operating in the general manner described is old, and one form of such apparatus is disclosed in the co-pending application of Ryan and Levine, Serial No. 579,872, filed February 26, 1945, entitled Depth sounding apparatus. Reference is made to the previously filed application for certain details of the apparatus such as the construction of the stylus and the related recording equipment.

The present invention differs from previously known systems in that it provides for the transmission of only a short train of waves from the oscillator 1 directly to the transducer 3, while substantially disabling the amplifier 2, to prevent the amplification and application to the stylus of powerful signals received directly from the local oscillator. The present invention is further concerned with the specific details of the apparatus for carrying out the new procedure in an efficient manner.

The oscillator 1 may be of various known types, but the particular form shown, which has been found effective, consists of a tetrode 8 having an indirectly heated cathode 9, control grid 10, screen grid 11, and anode 12. The cathode 9 is connected to a tap 13 on an inductance 14, which with a tuning condenser 15 constitutes the tank circuit of the oscillator. The upper end of the tank circuit is connected through a condenser 16 to the control grid 10, the latter being connected to ground through a grid leak resistor 17. When the circuit is inactive, the lower end of the tank circuit is isolated, but when the circuit is to be energized, the lower end of the tank circuit is connected to ground over a lead 18 and contacts 19 on the switch 5. The anode 12 is connected through a coupling inductance 20 to the positive terminal of a source of space current 21. The screen grid 11 is maintained at a positive potential less than that of the anode 12 by connecting it to the source 21 through a resistor 22, and to ground through a resistor 23. Bypass condensers 24 and 25 are preferably provided.

The anode 12 is coupled directly to the input of the transducer 3 through a coupling condenser 26, and is also coupled to the input of the amplifier 2 through a condenser 27 and a tuned circuit 28, tuned to the frequency of oscillation of the oscillator. The circuit 28, as shown, consists of a tapped inductance 29 and a condenser 30 connected in parallel, the lead 32 from the condenser 27 being tapped into the circuit 28 at the tap 31 on the inductance 29. The lower end of the tuned circuit 28 is connected to ground, and the upper end is connected to the input of the amplifier 2 and to a lead 33 adapted to be connected through contacts 34 of the switch 5 to ground.

As illustrated diagrammatically in the drawing, the record strip 7 is adapted to be unwound from a spool 35, and wound upon a spool 36, which is connected through a shaft 37, a spur gear 38, and a pinion 39 to a driving motor 40. The shaft 37 also carries a bevel gear 41 driving a bevel gear 42 which is connected by a shaft 43 to a bevel gear 44 driving a bevel gear 45 and a shaft 46. The shaft 46 drives the arm 6 through one pair of bevel gears 47 and 48, and drives a cam 49 synchronously with the arm 6, through a pair of bevel gears 50 and 51. Once during each revolution, the cam 49 momentarily closes the contacts 19 and 34, to ground the leads 18 and 33. As shown in the drawing, this closure occurs at the time the arm 6 is carrying the stylus across the upper edge of the record strip 7.

Closure of the contacts 19 connects the lower end of the tank circuit including the inductance 14 to ground, thereby completing the oscillator circuit. This oscillator circuit is of a known type in which the input and output circuits of the tube 8 are coupled by the inductance 14 by virtue of the fact that the cathode 9 is connected to the tap 13 on the inductance. Oscillations are therefore generated in the anode circuit of the tube and applied through the condenser 26 to the input of the transducer 3, where they are converted into mechanical vibrations of corresponding frequency, which are sent out.

To increase the transfer of power from the oscillator to the transducer, it is desirable to shunt a condenser 81 and an inductance 82 across the input of the transducer, the values of capacity and inductance being such as to neutralize the reactance of the transducer at the operating frequency and present to the oscillator a resistive load of appropriate value. It may be assumed that, for operation at 50,000 cycles, the transducer is of the piezo-electric type having an impedance equivalent to a resistance of about 400 ohms in series with a capacity of about 3300 mmf., under which conditions the inductance 82 may have a value of about 1 mh., and the condenser 81 a value of about 7000 mmf.

It is also possible for oscillations to be transmitted from the oscillator 1 through the condenser 27 and through the tuned circuit 28 to the input of the amplifier 2. However, little energy gets through the condenser 27 to the tuned circuit 28, and what gets through is substantially short-circuited because of the fact that the lead 33 is connected to ground over the contacts 34 while the oscillator is excited by closure of the contacts 19.

Relatively little power is by-passed through the condenser 27 despite the short-circuiting of the circuit 28, during transmission of signals from the oscillator to the transducer, because both the condenser 27 and the inductance 29 have relatively high impedances as compared to the transformer. Thus condenser 27 may have a capacity of 600 mmf. and the inductance 29 a total value of 17 mh., and the condenser 30 a value of 100 mmf.

Because of the fact that the capacity of the condenser 27 is low as compared to the combined capacity of the transducer 3 and the condenser 81, the grounding of the lead 33 has very little detuning effect on the transducer circuit.

It should be noted that it is frequently desirable to produce a mark near the upper edge of the record strip 7, to show the instant at which the signal is transmitted from the transducer 3, and because of the relatively great intensity of the signals applied to the transducer from the oscillator 1, currents of sufficient intensity to record a base line on the strip 7 may be produced in the stylus, despite the short-circuiting of the input circuit of the amplifier because of leakage coupling between the oscillator and the stylus. Such a base line is indicated at 7a on the strip 7.

The contacts 19 and 34 are closed only momentarily by the cam 49, and their opening immediately disables the oscillator 1 and takes the ground connection off the input of the amplifier 2, placing the latter in sensitive condition to receive signals from the transducer 3.

It is to be noted that during reception, the tuned circuit 28 has a high impedance relative to that of the transducer circuit, and the tapped coil 29 functions as a step-up transformer to match the impedance of the transducer circuit to that of the amplifier circuit and increase the voltage applied to the amplifier 2. Therefore, an efficient coupling is provided between the transducer and the amplifier during the signal-receiving period of the cycle.

Ordinarily, no signals are applied to the lead 32 following disablement of the oscillator 1, until an echo is received by the transducer 3. Such an echo is converted by the transducer into an electrical wave which is amplified by the amplifier 2 and applied to the stylus arm 6 and the stylus to produce a mark on the record strip 7. The position of the stylus on the strip 7 at the time the echo is received depends upon the distance from the transducer to the echo producing medium, since the arm 6 rotates at constant speed. Each rotation of the arm and stylus produces a short, arcuate line on the strip 7, which arcuate lines in the aggregate produce a line 7b longitudinal of the strip.

It will be apparent from the foregoing description that the circuit of the invention is relatively simple and inherently reliable because of the fact that the oscillator is permanently connected to the transducer and the amplifier. Furthermore, the production of excessive currents in the output of the amplifier 2 due to reception of signals directly from the local oscillator is prevented by short-circuiting the input of the amplifier 2 simultaneously with the excitation of the oscillator.

By virtue of the fact that the synchronous switch has the function of only momentarily grounding two circuits, this switch can be made very simple and reliable and can readily be of the cam-actuated type as shown. Many previous circuits have employed relatively complicated and troublesome commutators and the like for accurately making and breaking numerous circuits in a predetermined sequence.

Figure 2:
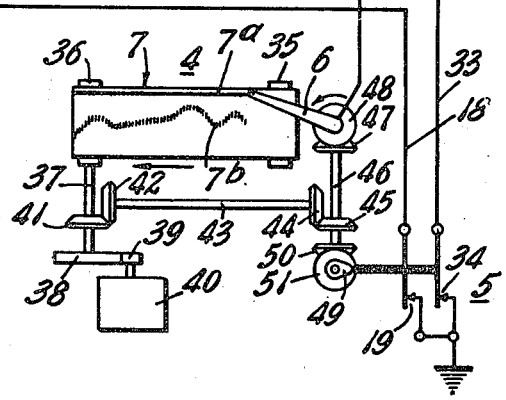
Fig. 2 is a schematic diagram showing a modification of a portion of the system of Fig. 1.

There is shown in Fig. 2 a modification of the circuit, in which a network 94 consisting of a series inductance 90 and shunt condensers 91 and 92 is substituted for the tuned circuit 28 of Fig. 1. The values of inductance and capacity are such that, at the operating frequency, the reactances of all three elements are the same, under which conditions the network constitutes a quarter wave length transmission line, and the grounding of the lead 33 does not appreciably affect the input impedance, looking into the network. Hence, the grounding of the lead 33 does not alter the tuning of the transducer input circuit. For operation at 50,000 cycles, the inductance 90 may have a value of 100 mh., and condensers 91 and 92 may each have a value of 100 mmf.

Although for the purpose of explaining the invention, one particular embodiment thereof has been described in detail, numerous modifications in the circuit shown will be obvious to those skilled in the art, and the invention is therefore to be limited only to the extent set forth in the appended claims.

I claim:

1. Echo ranging apparaus comprising: electric means having a control circuit and having an output circuit in which electric oscillations are produced in response to actuation of said control circuit; a transducer for converting electrical oscillations into another form of wave energy of corresponding frequency, and for converting waves of said other form into electric oscillations; an amplifier having input and output circuits; indicating means movable at a predetermined rate through a path, and responsive to reception of electric oscillations to indicate its position in said path of the instant of said reception; means permanently connecting said output circuit to said transducer and to the input of said amplifier, including a tuned parallel circuit tuned to the frequency of oscillations and connected in shunt to the input of said amplifier, and a connection from the output of said electric means to a tap on said tuned circuit; means connecting said output of said amplifier to said indicating means; and synchronous switch means for periodically momentarily activating the control circuit of said electric means and simultaneously short-circuiting the input circuit of said amplifier at recurring intervals while said indicating means is in a predetermined position in its path.

2. Echo ranging apparatus comprising: electric means having a control circuit and having an output circuit in which electric oscillations are produced in response to actuation of said control circuit; a transducer for converting electrical oscillations into another form of wave energy of corresponding frequency, and for converting waves of said other form into electric oscillations; an amplifier having input and output circuits; indicating means movable at a predetermined rate through a path, and responsive to reception of electric oscillations to indicate its position in said path at the instant of said reception; means permanently connecting said output circuit of said electric means to said transducer and to the input circuit of said amplifier; means connecting the output circuit of said amplifier to said indicating means; and synchronous switch means for periodically, momentarily actuating the control circuit of said electric means and simultaneously short-circuiting the input circuit of said amplifier to disable it at recurring intervals while said indicating means is in a predetermined position in its path; said means for connecting the output circuit of said electric means to said transducer and to the input circuit of said amplifier including tuning means in shunt to said transducer for tuning it to the frequency of said oscillations, and circuit means interposed between said amplifier input circuit and the juncture of the output of said electric means and transducer for reducing the effect on the tuning of said transducer of the short-circuiting of said amplifier.

3. Apparatus as described in claim 1 including: tuning means in shunt to said transducer for tuning it to the frequency of said oscillations.

4. Echo ranging apparatus comprising: electric means having a control circuit and having an output circuit in which electric oscillations are produced in response to actuation of said control circuit; a transducer for converting electrical oscillations into another form of wave energy of corresponding frequency, and for converting said other form into electric oscillations; indicating means movable at a predetermined rate through a path and responsive to reception of electric oscillations to indicate its position in said path at the instant of said reception; an amplifier having input and output circuit, the output circuit being connected to said indicating means; means permanently connecting said output circuit of said electrical means to said transducer; tuning means in shunt to said transducer for tuning it to the frequency of said oscillations; synchronous switch means for periodically, momentarily actuating the control circuit of said electric means and simultaneously short-circuiting the input circuit of said amplifier to disable it at recurring intervals while said indicating means is in a predetermined position in its path; and a quarter wave length transmission line connecting the input circuit of said amplifier to the juncture of said electric means and transducer.

HENRY T. WINCHEL.

REFERENCES CITED

The following references are of record in the file of this patent:

UNITED STATES PATENTS

| Number | Name | Date |
| --- | --- | --- |
| 1,972,889 | Hayes | Sept. 11, 1934 |
| 2,201,943 | Dallin | May 21, 1940 |
| 2,410,065 | Harrison | Oct. 29, 1946 |
| 2,410,066 | Harrison | Oct. 29, 1946 |
| 2,424,030 | Hayes | July 15, 1947 |